Aug. 14, 1934.   R. N. BURTON   1,970,030
TRACTOR FOR SEMITRAILERS
Filed Oct. 2, 1931   2 Sheets-Sheet 1
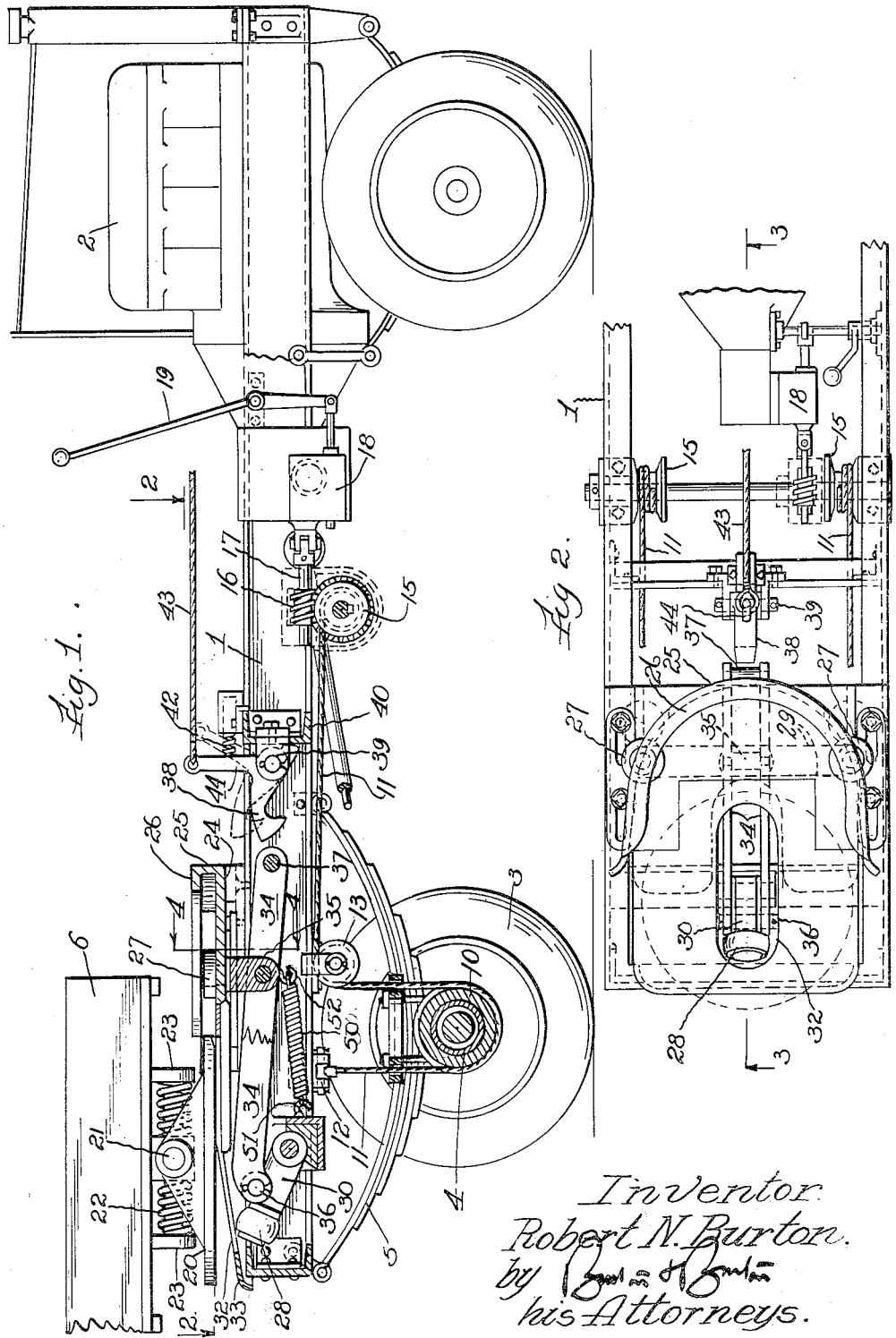
Inventor
Robert N. Burton
by [signature]
his Attorneys.

Aug. 14, 1934.  R. N. BURTON  1,970,030
TRACTOR FOR SEMITRAILERS
Filed Oct. 2, 1931  2 Sheets-Sheet 2
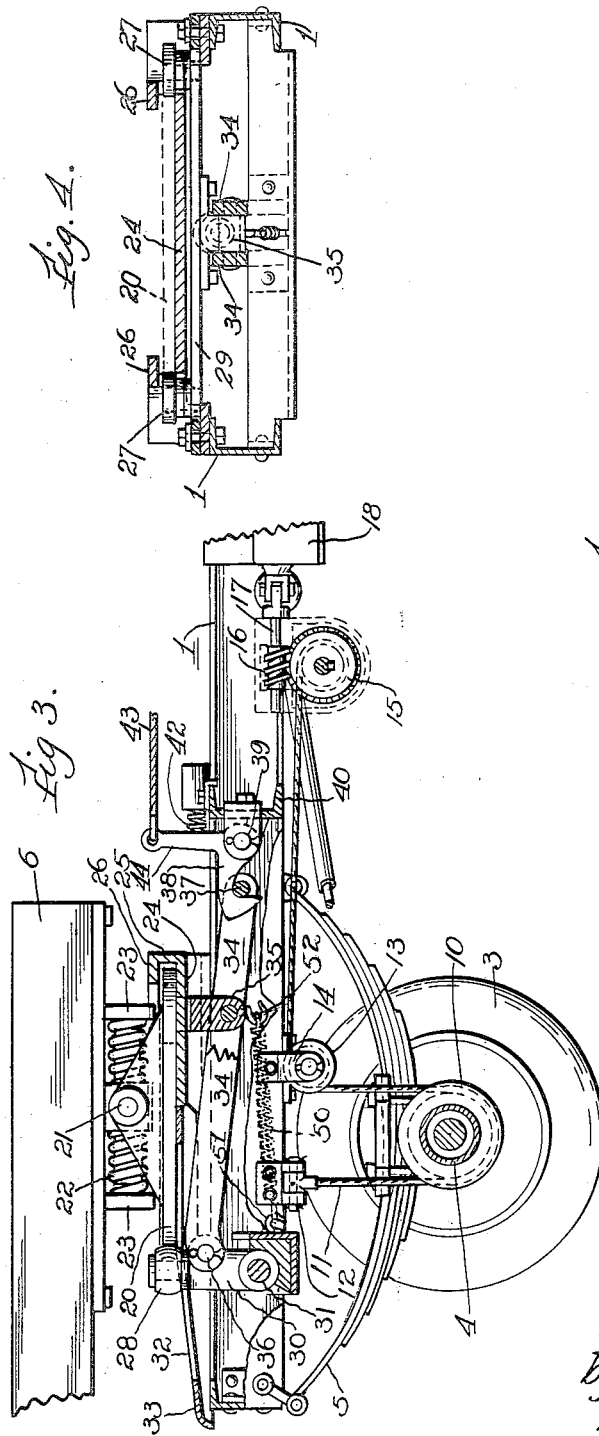
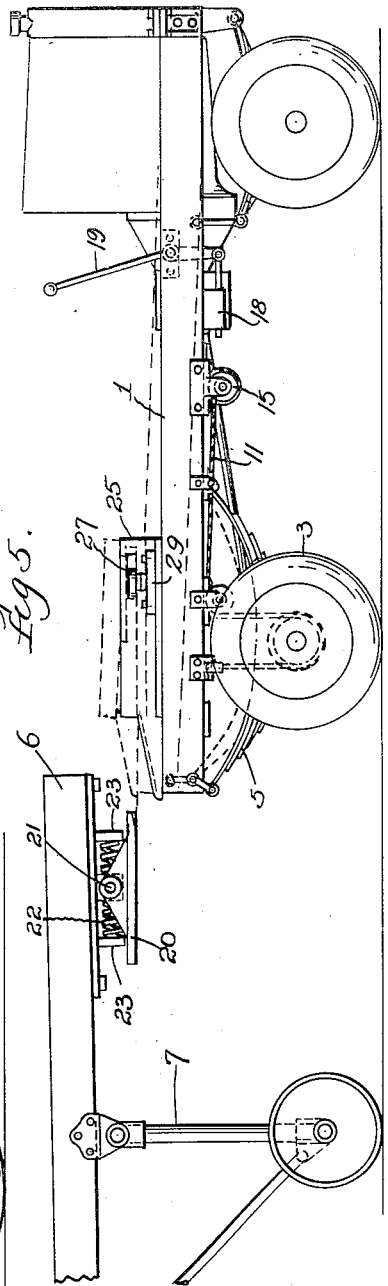
Inventor.
Robert N. Burton.
by [signature]
his Attorneys.

Patented Aug. 14, 1934

1,970,030

UNITED STATES PATENT OFFICE 1,970,030

TRACTOR FOR SEMITRAILERS

Robert N. Burton, River Forest, Ill., assignor to Highway Trailer Company, Edgerton, Wis., a corporation of Wisconsin Application October 2, 1931, Serial No. 566,389

14 Claims. (Cl. 280—33.1)

This invention relates to tractor trailer vehicle combinations, and its purpose is to provide means for facilitating coupling and uncoupling of the tractor and trailer, and the invention includes means for varying the height of the tractor coupling member at will to insure its proper registration with the coupling means of the trailer. The invention consists of certain features and elements of construction in combination as herein shown and described, and as indicated by the claims.

In the drawings:

Figure 1 is a side elevation of the tractor vehicle, a portion of the same being shown in vertical section.

Figure 2 is a top plan view of the coupling means carried by the tractor.

Figure 3 is a vertical sectional view of the coupling means taken as indicated at line 3—3 on Figure 2, but showing the parts in coupled position.

Figure 4 is a transverse section taken at line 4—4 on Figure 1.

Figure 5 is a diagrammatic side elevation of the tractor and trailer with the tractor adjusted preparatory to coupling to the trailer.

The drawings illustrate a motor truck employed as a tractor vehicle, having a frame, 1, carrying an engine, 2, at the forward end, connected in the usual way to rear drive wheels, 3, whose axle, 4, supports the rear end of the frame, 1, on springs, 5. The forward end of the semi-trailer frame, 6, is carried by the rear end of the tractor frame, 1, so that a considerable portion of the weight of the trailer and its load comes on the springs, 5, and tends to depress them more or less when the vehicles are coupled together. Consequently whenever the tractor and trailer are uncoupled the springs, 5, are unloaded by the amount of this weight and react or expand upwardly, shifting the rear end of the tractor frame, 1, upwardly by a corresponding amount. The trailer is usually supplied with temporary supporting means such as that shown at 7 in Figure 5, by which its forward end is held elevated at approximately the height at which it is normally carried by the tractor. In some instances these supports are adjustable so that they may be lowered and secured in position in contact with the ground before the vehicles are actually uncoupled; in other instances the supports are a little short of the distance between the ground and the trailer frame while it remains in coupled relation, but the trailer is dropped an inch or two in uncoupling, whereupon the supports assume the load of its forward end. In either case, when the tractor returns to pick up the trailer, the unloaded condition of the rear end of the tractor causes it to be elevated, as indicated in dotted lines in Figure 5, considerably above the proper position for registering with the coupling means of the trailer frame, 6. Heretofore, it has been common practice to provide an inclined surface on the rear end of the tractor which could be forced under the forward end of the trailer for lifting it into registering relation during the coupling operation, but this forcible method for securing registration requires the trailer to be securely held against rearward movement either by blocking the wheels or by means of brakes on the trailer, and unless the vehicles are on fairly level ground this method may involve considerable difficulty and risk. The present invention includes means for raising and lowering the rear end of the tractor by compressing its springs to bring the coupling means of the tractor into proper registration with the coupling elements of the trailer so that the connection may be effected without any forcible lifting of the trailer.

For purposes of illustration I have shown a comparatively simple mechanism which includes a pair of pulleys, 10, on the rear axle, 4, of the tractor, with cables, 11, trained around said pulleys with one end of each cable anchored to the frame, 1, in a suitable bracket, 12, while the other end passes over an idler pulley, 13, journaled in a bracket, 14, on the frame, 1, and thence extends forwardly to a winding drum, 15. Power means for operating the drum, 15, includes a worm, 16, and its shaft, 17, extending from any suitable power take-off gear enclosed in the housing, 18, and connectible at will with the engine, 2, by means of a shifter lever, 19. A power take-off of this character is usually connected into the transmission gearing so that with the vehicle transmission set in neutral position the regular vehicle clutch may be employed for coupling the engine to the power take-off to operate a mechanism other than the rear drive wheels on the tractor. This arrangement permits the driver of the tractor to back his vehicle adjacent the forward end of the trailer, 6, as shown in Figure 5, and then by employing the shifter lever, 19, to operate the winding drum, 15, for tensioning the cable, 11, and lowering the rear end of the frame toward the axle, 4, to a position at which the coupling devices of tractor and trailer will register properly. The worm, 16, being of such a pitch as to be non-reversible, will hold the frame, 1, and axle, 4, in this adjusted relation until the coupling has been effected, after which the gearing in the housing, 18, may be manipulated to actuate the worm, 16, in reverse direction for slackening the cable, 11, sufficiently to permit free action of the springs, 5, in travel on the road.

The coupling mechanism for the tractor and trailer illustrated in the drawings comprises an upper fifth wheel or disk, 20, carried by the transverse trunnions, 21, on the trailer, these trunnions being preferably mounted between longitudinally extending cushion springs, 22, through which the draft is communicated to stops, 23, secured to the trailer frame, 6. The tractor is provided with a fixed platform, 24, which constitutes the lower fifth wheel, and which is formed at its forward edge with an upstanding flange, 25, and an overhanging flange, 26, extending in arcuate form. When the disk, 20, of the trailer, being circular, is nexted in the arcuate flange, 25, it may rotate about its own axis upon the platform, 24, to provide the desired articulation between the tractor and trailer vehicles in turning corners and following curved paths of travel. When the disk, 20, is thus associated in coupled relation with the platform, 24, the edge of the disk contacts with a pair of anti-friction rollers, 27, set in openings in the flange, 25, and with a third roller, 28, which engages the rear edge of the disk, 20 as seen in Figure 3. The rollers, 27, are longitudinally movable through a limited range, being carried by a transverse yoke member, 29, slidably mounted on the tractor with respect to the platform, 24, and the roller, 28, is carried by a post, 30, mounted to swing about a horizontal pivot, 31, which is disposed below the plane of the platform 24.

Before the vehicles are coupled together the post, 30, is disposed in rearwardly inclined position, as shown in Figure 1, with its roller, 28, withdrawn downwardly through a slot, 32, in the apron, 33, which serves as a control to the platform, 24. As the tractor is backed toward the trailer, and the upper fifth wheel, 20, slides over the platform, 24, toward the forward flange, 25, of the platform, it encounters the rollers, 27, and forces them forward. The yoke, 29, which carries the rollers, 27, is connected to the post, 30, by link bars, 34, pivoted to a depending lug, 35, on the yoke, and to a transverse pivot pin, 36, on the post, 30. The forward movement of the rollers, 27, is thus transmitted to the post, 30, causing it to swing upwardly against the rear edge of the fifth wheel disk, 20, as the latter arrives in its nested position in the curved flange, 25. At this position of the parts a cross bar, 37, carried by the forwardly projecting ends of the links, 34, is caught and retained by a latch or hook, 38, pivoted at 39 to a cross member, 40, of the frame, 1, and retained normally in latching position by a spring, 42, or other suitable means. Thus the upper fifth wheel, 20, is secured rotatively in its working position on the platform, 24, being retained against upward displacement by the overhanging lip or flange, 26, which extends rearwardly from the transverse diameter of the disk for some little distance, as seen in plan in Figure 2.

For uncoupling the vehicles after the temporary supports, 7, have been suitably adjusted to receive the weight of the forward end of the trailer, it is only necessary for the driver to pull the cord, 43, attached to the bell crank arm, 44, of the latch or hook, 38, thus raising the hook out of engagement with the cross bar, 37, and permitting the platform, 24, to be moved ahead and withdrawn from engagement with the disk, 20. The hook, 38, being released, allows the post, 30, to rock backward and downwardly out of the way of the disk, 20, and preferably a spring, 45, is provided to hold it normally in this position, ready for coupling the vehicles. The links, 34, of course, carry the rollers, 27, rearwardly when the post, 30, rocks to its inclined position, and when tension upon the cord, 43, is released the latch hook, 38, returns to its operative position ready to catch the cross bar, 37, when it again moves forward in coupling operation. Since the weight of the trailer and its load will more or less compress the springs, 5, while the vehicles are coupled, there is no occasion to employ the winding drum, 15, and the cable, 11, in connection with the uncoupling of the vehicles unless it be desired simply to check the rear end of the tractor frame, 1, against sudden rebound as the vehicles separate, in which event the cable, 11, may be put under tension just sufficiently to hold the axle, 4, in the same relation to the frame, 1, at which it stands while the vehicles remain coupled. This tension may be released as soon as the uncoupling is accomplished in order that the tractor springs, 5, may be given their proper play.

To insure that the roller, 28, shall remain normally in its lowered position, as shown in Figure 1, when the vehicles are uncoupled, so that it shall not in any way interfere with the approach of the disk member, 20, as it rides onto the platform, 24, a spring, 50, may be anchored to the frame at 51 and engaged at 52 with the lug, 35, of the yoke so as to constantly exert a yielding pull rearwardly on the yoke and the rollers, 27, associated with it. The tension of this spring need not be great as compared with the force normally available to overcome it in moving the parts to coupling position.

I claim:

1. A tractor provided with means for coupling to a semi-trailer, and including a chassis frame on which said means is carried, road wheels and an axle with springs by which said frame is supported on said axle, and means connected for actuation by the engine of the tractor adapted for adjusting said frame vertically with respect to the axle in opposition to the said springs to vary the height of the coupling means from the ground.

2. The combination of a tractor and a semi-trailer provided with cooperating coupling devices adapted for mutual engagement by relative horizontal movement, said tractor having a chassis frame on which its coupling device is carried in substantially fixed relation, and including road wheels and an axle with springs by which said frame is supported on said axle, together with means connected for actuation by the engine of the tractor arranged for forcibly depressing the tractor frame in opposition to its springs for effecting horizontal registration of the tractor and trailer coupling devices.

3. A tractor provided with means for coupling to a semi-trailer and including a chassis frame on which said means is carried, with road wheels and means by which said frame is supported on said wheels with a range of vertical movement in respect thereto, and mechanism on the tractor operable by the power of the tractor engine adapted for adjusting the chassis frame in relation to the wheels within said range for varying the height of the coupling means from the ground.

4. A tractor provided with means for coupling to a semi-trailer and including a chassis frame on which said means is carried, road wheels and an axle with springs by which said frame is supported on said axle, and means on the tractor arranged for forcing the frame toward the axle in opposition to said springs, including a flexible member engaging said axle and extending to winding means on the tractor frame, whereby the actuation of said winding means serves to vary the height of the coupling means from the ground.

5. A tractor provided with means for coupling to a semi-trailer and including a chassis frame on which said means is carried, road wheels and an axle with springs by which said frame is supported on said axle, and means on the tractor arranged for forcing the frame toward the axle in opposition to said springs, including a flexible member having one end anchored to the frame, said member extending thence under the axle and then to winding means on the frame, whereby the actuation of said winding means serves to vary the height of the coupling means from the ground.

6. The combination of a tractor and a semi-trailer provided with cooperating coupling devices adapted for mutual engagement by relative horizontal movement, said trailer including temporary supporting means for its forward end adapted to hold its coupling device at a distance above the ground, and the tractor including a chassis frame on which its coupling device is carried in substantially fixed relation thereto, said tractor including road wheels and an axle with springs by which the chassis frame including its coupling device is supported on said axle, together with means for forcibly depressing the tractor frame and its coupling device in opposition to its springs, including a flexible member engaging said axle and extending to winding means on the tractor frame connected for actuation by the engine of the tractor, whereby the height of the coupling means from the ground may be varied in effecting horizontal registration of the tractor and trailer coupling devices.

7. In a tractor and semi-trailer provided with cooperating coupling devices, in combination, a platform on the tractor frame and a circular fifth wheel member pendantly pivoted to the trailer structure for swinging in fore-and-aft direction, and means for positioning said circular member on said platform consisting of a plurality of rollers constituting a circular group mounted for rotating about their axes respectively in a plane parallel to and above the plane of said platform, and arranged in said plane in a circle of diameter for admitting said circular fifth wheel member within said group in circumferential tangency to the circular periphery of the several rollers, at least one of said rollers being mounted for displacement from the plane of the group to release said circular fifth wheel member in uncoupling the vehicles, and means operable at will for displacing said displaceable member.

8. The comination of a tractor and a semi-trailer provided with cooperating coupling devices which include a platform on the tractor frame and a fifth wheel member of circular outline carried by the trailer and adapted to rest upon said platform in coupled position, marginal stop rollers engaging the periphery of said fifth wheel member in its coupled position, one or more of said rollers at the rear side of said member being mounted for swinging rearwardly and downwardly below the surface of the platform, and a releasable detent for upholding said roller or rollers to retain the fifth wheel on the platform in coupled position.

9. The combination of a tractor and a semi-trailer provided with cooperating coupling devices which include a platform on the tractor frame and a fifth wheel member of circular outline carried by the trailer and adapted to rest upon said platform in coupled position, longitudinally movable stop means associated with the platform engageable with the forward edge of said fifth wheel member and movable forwardly thereby as said member travels over the platform to its final coupled position, together with a stop engageable with the rear edge of said fifth wheel mounted for swinging rearwardly below the surface of the platform but connected to the other face of the platform to be swung into such engagement with the fifth wheel as the latter reaches its forward limit of movement on the platform, and detent means for holding the stops at such position.

10. The combination of a tractor and a semi-trailer provided with cooperating coupling devices which include a platform on the tractor frame and a fifth wheel member of circular outline carried by the trailer and adapted to rest upon said platform in coupled position, a pair of rollers spaced apart laterally and movable longitudinally over the platform in contact with the forward edge of said upper fifth wheel as it approaches its final coupled position on the platform, together with a roller engageable with the rear edge of said fifth wheel at said final position of the latter, said roller being mounted to be swung rearwardly and downwardly below the surface of the platform by a rearward shifting of said fifth wheel thereon but connected to said other rollers for swinging upward to engage the fifth wheel when said rollers reach their forward limit of longitudinal movement on the platform, and a detent releasable at will arranged for holding said rollers at said limiting position to maintain the parts in coupled relation.

11. The method of coupling a tractor and semi-trailer which includes supporting the semi-trailer with clearance space under its forward end to receive the rear end portion of the tractor, forcibly compressing the tractor springs to lower the coupling member of the tractor to a position for horizontal registration with the coupling member of the trailer and then moving the tractor horizontally into said clearance space and effecting mutual engagement of the coupling members.

12. The method of coupling a tractor and a semi-trailer which includes parking the trailer with its forward end overhanging a clearance space sufficient to accommodate the rear portion of the tractor, adjusting said rear portion of the tractor vertically by applying the engine power of the tractor to forcibly compress its rear springs for lowering its frame, and coupling means carried thereby to a position for horizontal registration with the coupling means of the trailer and then backing the tractor under the trailer without altering the vertical position of the latter and effecting mutual engagement of the coupling means.

13. The method of coupling a tractor and semi-trailer which includes supporting the semi-trailer with clearance space under its forward end to receive the rear end portion of the tractor, forcibly compressing the tractor springs to lower the coupling member of the tractor to a position for horizontal registration with the coupling member of the trailer and moving the tractor horizontally into said clearance space and effecting mutual engagement of the coupling members, and finally releasing the tractor springs from the compressive force by which the coupling member was lowered for registration.

14. The method of uncoupling a tractor and semi-trailer which consists in first lowering a temporary support on the trailer frame into supporting position at a short distance above the road surface, then forcibly compressing the tractor springs to lower the trailer support to the ground for transferring the load of the trailer to said support and then disengaging the coupling means of the tractor and trailer and withdrawing the tractor horizontally from under the trailer.

ROBERT N. BURTON.